(12) United States Patent
Mashkin et al.

(10) Patent No.: US 10,978,848 B2
(45) Date of Patent: Apr. 13, 2021

(54) FIBER LASER SYSTEM WITH MECHANISM FOR INDUCING PARASITIC LIGHT LOSSES

(71) Applicant: IPG PHOTONICS CORPORATION, Oxford, MA (US)

(72) Inventors: Andrey Mashkin, Oxford, MA (US); Valentin Fomin, Oxford, MA (US); Fedor Shcherbina, Oxford, MA (US); Alexander Dronov, Oxford, MA (US); Andrey Abramov, Oxford, MA (US); Vadim Mironov, Oxford, MA (US); Eugene Scherbakov, Oxford, MA (US)

(73) Assignee: IPG PHOTONICS CORPORATION, Oxford, MA (US)

( * ) Notice: Subject to any disclaimer, the term of this patent is extended or adjusted under 35 U.S.C. 154(b) by 114 days.

(21) Appl. No.: 16/314,794

(22) PCT Filed: Jun. 30, 2017

(86) PCT No.: PCT/US2017/040213
§ 371 (c)(1),
(2) Date: Jan. 2, 2019

(87) PCT Pub. No.: WO2018/005927
PCT Pub. Date: Jan. 4, 2018

(65) Prior Publication Data
US 2019/0312401 A1   Oct. 10, 2019

Related U.S. Application Data

(60) Provisional application No. 62/357,564, filed on Jul. 1, 2016.

(51) Int. Cl.
*H01S 3/30* (2006.01)
*H01S 3/00* (2006.01)
(Continued)

(52) U.S. Cl.
CPC .......... *H01S 3/0078* (2013.01); *H01S 3/0064* (2013.01); *H01S 3/067* (2013.01);
(Continued)

(58) Field of Classification Search
CPC ...... H01S 3/0078; H01S 3/0064; H01S 3/067; H01S 3/08013; H01S 3/1618;
(Continued)

(56) References Cited

U.S. PATENT DOCUMENTS

5,909,306 A * 6/1999 Goldberg ................ G03F 7/704
359/337.1
5,991,314 A * 11/1999 Ionov ..................... H01S 3/0675
372/102
(Continued)

*Primary Examiner* — Kinam Park
(74) *Attorney, Agent, or Firm* — Yuri Kateshov, Esq.

(57) ABSTRACT

A method of inducing light losses at a parasitic wavelength in a fiber laser system includes providing a wavelength discriminator (WD) spaced from and between feeding and process fibers or from the end output of the feeding fiber so as to induce losses of light at parasitic wavelength. The device implementing the disclosed method is configured with a laser source, the delivery fiber and WD spaced at a distance between the surface to be treated and the end of the delivery fiber, wherein the WD receives the parasitic light over free space and is configured as a dichroic filter inducing losses to the light at the parasitic wavelength.

16 Claims, 6 Drawing Sheets

(51) Int. Cl.
  *H01S 3/067* (2006.01)
  *H01S 3/08* (2006.01)
  *H01S 3/16* (2006.01)
  *H01S 3/108* (2006.01)

(52) U.S. Cl.
  CPC ........ *H01S 3/0804* (2013.01); *H01S 3/08013* (2013.01); *H01S 3/08027* (2013.01); *H01S 3/1086* (2013.01); *H01S 3/1618* (2013.01); *H01S 3/0675* (2013.01); *H01S 2301/02* (2013.01); *H01S 2301/03* (2013.01)

(58) Field of Classification Search
  CPC .. H01S 3/0675; H01S 3/1086; H01S 3/08027; H01S 3/0804; H01S 2301/02; H01S 2301/03
  See application file for complete search history.

(56) References Cited

U.S. PATENT DOCUMENTS

| | | | | |
|---|---|---|---|---|
| 7,912,099 | B2* | 3/2011 | Gapontsev | H01S 3/2316 372/6 |
| 8,081,376 | B2* | 12/2011 | Kakui | H04B 10/2935 359/341.33 |
| 2010/0290106 | A1* | 11/2010 | DiGiovanni | H01S 3/094046 359/334 |
| 2014/0086526 | A1* | 3/2014 | Starodubov | H01S 3/06791 385/29 |

* cited by examiner

FIG. 1
Known art

FIG. 2
Known art

FIG. 17

FIBER LASER SYSTEM WITH MECHANISM FOR INDUCING PARASITIC LIGHT LOSSES

BACKGROUND OF THE INVENTION

Field of the Invention

This invention relates to fiber laser systems configured with a wavelength discriminator (WD) receiving light at parasitic and signal wavelengths over free space and configured to maximize losses of light at the parasitic wavelength in the fiber laser system.

Prior Art Discussion

The lasing at unwanted, parasitic wavelengths in many optical fiber laser systems is undesirable and may be caused by several factors. One of these factors is the existence of nonlinear effects, such as stimulated Raman scattering (SRS). Another factor relates to gain mediums doped with different species of rare-earth ions and the existence of different lasing levels in the gain medium, such as ytterbium (Yb) radiation in erbium (Er) lasers based on Er/Yb doped medium. The list of the above-disclosed is not exclusive and may be greatly expanded. Parasitic lasing severely limits the performance of high gain solid state lasers. It reduces the overall efficiency of the optical system, damages individual components and destabilizes the operation of the optical system.

The problem of radiation at parasitic wavelengths becomes even more severe in fiber laser systems characterized by uncontrollable backreflection. Particularly vulnerable are fiber laser systems used for processing various materials when the level of the back-reflection at parasitic wavelengths greatly changes depending on a laser treating process, material surface conditions and system's parameters.

Figure 1:
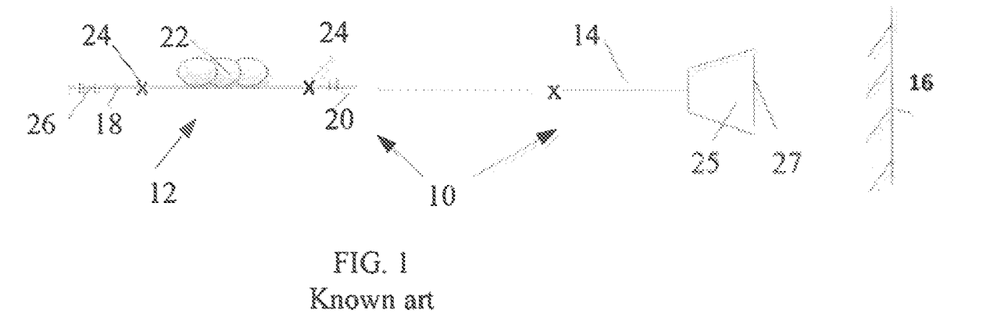
FIG. 1 is a diagrammatic optical schematic illustrating of a fiber laser system in accordance with the state of the art.

Referring to FIG. 1, a typical industrial fiber laser system 10 for processing a workpiece necessarily includes, among others, a light source, which may have one or more gain blocks 12 shown here as a laser, and a delivery fiber typically including feeding fiber 14 or feeding and process fibers which guide light towards surface 16 to be processed. The gain bock 12 is configured with an active fiber 22, which is doped, for example, with Yb ions, and often input and output passive signal fibers 18, 20, respectively. The passive fibers 18, 20 are coupled to respective opposite ends of active fiber 22 by splices 24. The passive and active fibers together with passive feeding fiber 14 define a waveguide supporting propagation of light at the single wavelength between gain block 12 and surface 16. Typically, the output end of the waveguide is coupled to an output optical coupler, such as beam expander 25 made of quartz and configured to reduce the power density of the output light. The output surface of beam expander 25 is typically provided with an antireflection (AR) layer or any other wavelength discriminator (WD) minimizing propagation of signal light, which is backreflected from the surface to be treated, into the waveguide. The AR layer is however transparent to light at other, parasitic wavelengths different from the signal wavelength of the signal light and originated in the fiber laser system and its delivery fiber due to relatively high optical intensities and fiber lengths. In other words, the signal light has a sufficient power to exceed a threshold for generating nonlinear effects resulting in light at the parasitic wavelength in the delivery passive fiber.

Figure 3:
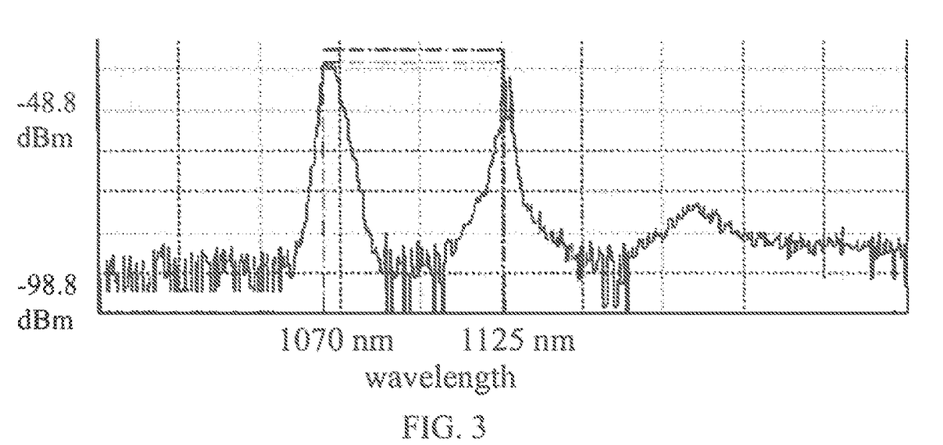
FIG. 3 is emission spectra of the laser of FIG. 1 during generation of Raman signal.

The light coupled into feeding fiber 14 has a power that can vary, based on the number of gain blocks 12, anywhere between several hundred watts and hundred kilowatts; the length of feeding fiber 14 can be substantial depending on how far surface 16 is located from the laser light source. Both the power and fiber lengths are major contributors to the generation of nonlinear effects, such as SRS. As a result, the spectrum of light of FIG. 3, emitted from the output end of feeding fiber 14 typically includes signal and parasitic wavelengths 1070 and 1125±x nm, respectively, before it is incident on surface 16. At least part of the incident light is backreflected into feeding fiber 14 which guides it towards the laser light source.

Figure 2:
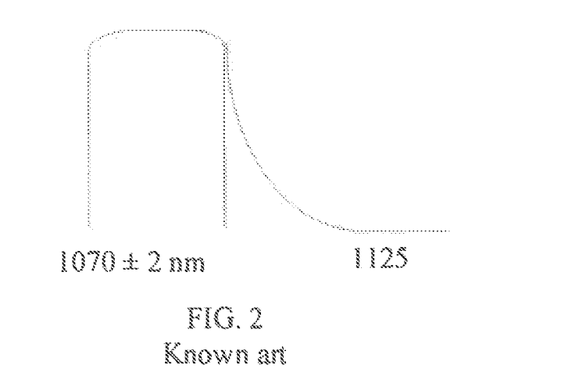
FIG. 2 is a reflective spectrum of the high reflection fiber Bragg grating (HRFBG) at 1070 nm wavelength of FIG. 1.

Since AR coating 27 is ineffective against backreflected parasitic light from surface 16, a resonator, capable of lasing the parasitic light, is formed between surface 16 and any formation within system 10 of FIG. 1 capable of retro-reflecting this light back to surface 16. For example, high reflectivity fiber Bragg grating (HRFBG) 26 of the schematic of laser system 10 (FIG. 1) retro-reflects the lion's share of backreflected parasitic light due to its reflectivity spectrum shown in FIG. 2. Besides HR FBG 26, splices 24 of FIG. 1 and other inner obstacles enabling the turnaround of the backreflected light at the parasitic wavelength, of course, are contributory factors to be reckoned with.

The formation of the resonator is competed by a gain medium between the surface and backreflecting formation. Thus the gain medium can be the entire waveguide including active 22, passive 18 and 20 and feeding 14 fibers or any individual part thereof. The example of the latter is an Er laser amplifies light at parasitic, unwanted Er wavelength. Any additional output fiber and/or additional amplifying cascade coupled to the existing one only adds to the gain experienced by light at the parasitic wavelength. Thus, with the backreflection of light at the parasitic wavelength from external surface 16, the quality (Q) factor of this parasitic resonator increases and the generation at the parasitic wavelength begins.

Accordingly, it is highly desirable that losses of unwanted light in the parasitic resonator be as high as possible so as to suppress external backreflection and decrease the Q factor. This general requirement is met by filtering the light at the parasitic wavelength.

The issue here is where, within the parasitic resonator, a loss-inducing mechanism should be installed. Several attempts directed at preventing back-reflection at parasitic wavelengths have been made in systems disclosed below.

For example, U.S. Pat. No. 7,912,099 discloses slanted fiber Bragg gratings (FBG) located between neighboring gain blocks which constitute a fiber laser light source. Furthermore, at least one FBG is written in the delivery fiber. The slanted FBGs, particularly those used in fiber laser systems where output light should propagate over free space after it is emitted from the laser source, may have certain disadvantages. For example, the FBG induces undesirable losses of signal light at the signal wavelength; its reflection bandwidth is rather narrow allowing a considerable part of backreflected parasitic light to propagate along the waveguide in opposite directions. The backreflected light at the parasitic wavelength is guided along a feeding fiber which functions as gain medium for both forward and back-reflected light between the surface to be processed and the FBG. All in all, the disclosed FBG's configuration is not flexible: one cannot make it deeper and/or longer without detrimentally affecting the light at the signal wavelength.

Thus it is desirable to provide a wavelength discrimination mechanism inducing losses of light at a parasitic wavelength and configured to be more flexible than the known wavelength discriminating elements. Also, it is desirable to provide a fiber laser system which is configured with the wavelength discriminating component inducing losses of backreflected parasitic light before the latter is coupled into the delivery fiber.

Still another example of fiber laser systems operative to minimize detrimental effects of back reflected radiation at a parasitic wavelength is disclosed in USP 80813786. The disclosed laser system includes an optical component located between gain stages and configured to attenuate light at the parasitic wavelength which is generated in a delivery fiber. However, in this laser source, light at the parasitic wavelength uncontrollably propagates in the delivery fiber in opposite forward and backward directions which causes all the problems discussed above.

Typically, industrial fiber laser light sources, including the one disclosed in this patent, are provided with a delivery fiber guiding light to the surface to be laser treated. As a rule, the delivery fiber has a substantial length. One of ordinary skill in the art of the fiber laser systems is well aware that a greater fiber length lowers a threshold for generating SRS.

Many fiber laser systems include a passive process fiber delivering light to remote locations and thus often having a substantial length. Due to high optical intensities, which may reach hundreds of kilowatts, and great fiber lengths, the process fiber functions as gain medium or Raman-active medium. Typically, in high power fiber laser systems, the process fiber receives light from a feeding fiber, which is connected to the system's output fiber, by means of a bulk guide optical component, such as a beam coupler or beam switch. Left uncontrolled, parasitic light may be emitted from the delivery fiber at prohibitively high power levels. The result of this undesirable emission includes unwanted effects on the workpiece to be laser treated. Many industrial applications however do not tolerate the presence of the parasitic light. Furthermore, not all parasitic light incident on the workpiece is absorbed. Hence a part of the parasitic light backreflected from the workpiece is coupled into the feeding fiber and propagates towards the gain blocks and pumps. This presents the problems discussed above in regard to fiber laser systems in which parasitic light propagates backwards through gain blocks to pumps.

A need therefore exists for a method of increasing light losses at the parasitic wavelength in a "parasitic" resonator or gain medium for parasitic light.

Another need exists for a fiber laser system implementing the inventive method and provided with a wavelength discriminating mechanism which is configured to increase losses for radiation at the parasitic wavelength in the "parasitic" resonator.

SUMMARY OF THE DISCLOSURE

The above-identified needs are satisfied by a method providing placing of a wavelength discriminator (WD) in diverging, collimated or focused beam inside a delivery fiber system, which includes feeding and process fibers, or outside this delivery fiber system. The disclosed fiber laser system implements the above-described method with a wavelength discriminator (WD) configured to induce losses of parasitic light while transmitting signal light practically without any attenuation. The method and fiber laser system, as disclosed here, benefit single mode (SM) or multimode (MM) mid- and high-power fiber laser systems by minimizing losses at a signal wavelength and practically eliminating the influence of external uncontrollable parameters on the system's output stability.

In accordance with one aspect of the disclosure, the disclosed method includes providing the WD between an output end of the feeding fiber and the surface to be treated. As a result, the light at the parasitic wavelength circulating in the parasitic resonator experiences losses which lead to a high threshold for nonlinear effects which, in turn, translates into a higher, stable output power of signal light.

In another aspect of the disclosure, the above disclosed method of the above previous aspect also includes selecting the WD so as to minimize the backreflected light at the parasitic wavelength in the resonator. The WD is configured as a multilayer dichroic mirror coupled to a beam expander which is operatively connected to the output of the delivery fiber system. The light at signal and parasitic wavelengths propagates over free space within the expander before being filtered as it passes through the WD. This configuration is particularly, but not exclusively, advantageous for mid-power fiber laser systems outputting up to a few kW radiation.

Still in combination with any of the above aspects, the disclosed method further includes placing the WD in non-fiber components, such as couplers and beam switches, such that as light at signal or working and parasitic wavelengths propagates over the feeding fiber and free space before it is filtered by the WD. This aspect is particularly advantageous for high power fiber laser systems radiating ten to hundred kW outputs since the process fiber or fibers guide light practically free from parasitic frequencies to the workpiece.

In still another aspect of the disclosure, the method of any of the above-discussed aspects includes preventing not only the backreflected light at the parasitic wavelength but also forward propagating parasitic light generated upstream from the fiber delivery system. The light at the parasitic wavelength is determined by a sum of two variables—one, internal reflection, which depends on parameters of the fiber laser system and thus is constant, and the other, external reflection, which is a function of variable backreflected light at the parasitic wavelength. Accordingly, with the back-reflected parasitic light blocked from entering the resonator, whatever light at parasitic wavelength contained in the system's output, it is constant and thus easily determined.

In another aspect of the disclosure, the WD of any of the above aspects is positioned at an angle which is adjustable relative to an optical axis of the collimator so as to eliminate the backreflected light at the parasitic wavelength in the parasitic resonator without inducing significant losses to the light at the signal/working wavelength.

According to still another aspect, the method of the above-disclosed aspects further includes measuring a power and spectrum of the system output light and power of the backreflected light at the parasitic wavelength.

Another aspect of the disclosure is concerned with a method of maximizing losses of parasitic light in gain medium of the fiber laser system and method of any of the above disclosed aspects or independent therefrom.

The disclosed fiber laser system is configured with the WD and implements the method or methods disclosed in each of and any combination of the above aspects.

BRIEF DESCRIPTION OF THE DRAWINGS

The above and other aspects are discussed in detail in the following specific description which is accompanied with the drawings, in which.

SPECIFIC DESCRIPTION

Reference will now be made in detail to embodiments of the invention. Wherever possible, same or similar reference numerals are used in the drawings and the description to refer to the same or like parts or steps. The drawings are in simplified form and are not to precise scale. The term "couple" and similar terms do not necessarily denote direct and immediate connections, but also include connections through intermediate elements or devices.

Figure 4:
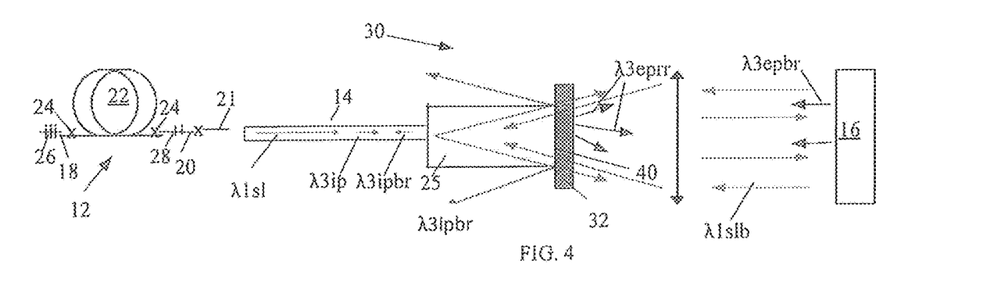
FIG. 4 is an optical schematic of the disclosed fiber laser system with a WD operative to induce losses of light at parasitic wavelengths by retro-reflecting the backreflected light at parasitic wavelengths.

FIG. 4 illustrates one of the aspects of this disclosure. As shown, a fiber laser system 30 is configured to implement the inventive method of maximizing losses of light at a parasitic wavelength in a parasitic resonator. The latter is formed, during the operation of system 30, by a gain medium, which is a fiber waveguide extending between a laser-treated surface 16 reflecting light and any formation in the fiber waveguide between the output end of a delivery fiber 38 capable of retro-reflecting the backreflected light.

The fiber laser system 30 is structured similarly to system 10 of FIG. 1 and includes laser source with gain block 12 which is configured with light emitters-doped active signal fiber 22 input, passive signal fibers 18 and 20 and passive output fiber 21 which are spliced at 24 to one another. The gain block 12 may be configured as a laser or amplifier, and for the illustration purposes it is configured as the fiber laser defined between HR FBG 26 and low reflectivity (LF) FBG 28 written in respective passive signal fibers 18 and 20.

The beam expander 25 is configured with a WD 32 realizing one of the main concepts of the disclosure: inducement of losses of light at a parasitic wavelength in fiber laser system 30. In particular, WD 32 of FIG. 4 increases losses of parasitic light in the parasitic resonator. As losses of the parasitic light increase in the resonator, a threshold for nonlinear effects, such as SRS, becomes higher which, in turn, leads to a higher and more stable output of system light and better processed surface 16 of the workpiece.

The laser 12 is a single transverse mode (SM) Fabri-Perrot oscillator operating in quasi-continuous regime (QCW) which emits signal light at a central signal $\lambda_{1sl}$ working wavelength of 1070 nm and optical intensities sufficient to exceed a threshold for generating parasitic light in feeding fiber 14. In the context of this disclosure, parasitic light is a result of Raman scattering; yet, as one of ordinary skill readily realizes, other non-linear effects causing generation of light at parasitic wavelengths are also considered here. It may also be configured to output system light in multiple transverse modes and operate in CW or pulsed regimes at central wavelengths different from 1070 nm which depend on the type of light emitting ions in active fiber 22.

Figure 5:
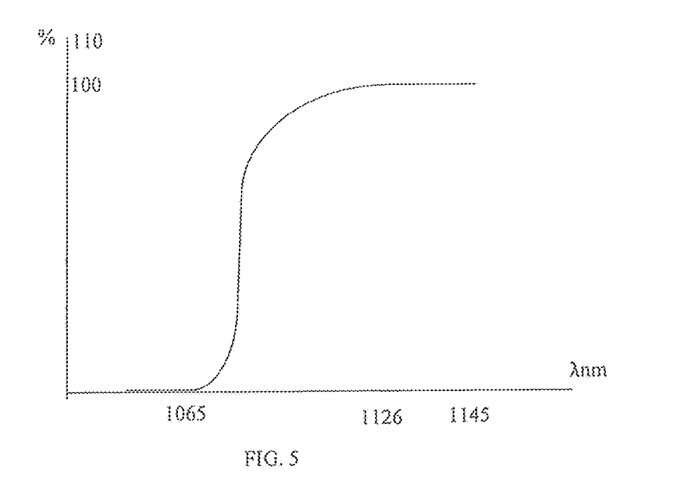
FIG. 5 is a reflective spectrum of the WD of FIG. 4.

As seen in FIG. 5, WD 32 is transparent to signal light at 1070±2 nm signal wavelength λ1. However, WD 32 can be configured to prevent external back reflection light at parasitic wavelengths λ3ebr and retro-reflect it back to surface 16, as indicated by λ3eprr. The WD 32 includes a dichroic mirror. As known to one of ordinary skill, the dichroic filter is configured with alternating layers of optical coatings having different refractive indices built up upon a glass substrate. The interfaces between the layers of different refractive index and high reflectivity index (up to 99%) produce phased reflections, selectively reinforcing certain wavelengths of light and interfering with other wavelengths. By controlling the thickness and number of the layers, the wavelength of the passband of the filter can be tuned and made as wide or narrow as desired. Because unwanted wavelengths are reflected rather than absorbed, dichroic filters do not absorb this unwanted energy during operation which otherwise leads to prohibitively high temperatures and eventual distraction of the filters.

The total light at parasitic wavelength in system 30 provided with WD 32 is a sum of two variables: internally reflected light from the WD and externally reflected light from system internal or external to the system obstacle, such surface 16. The share of the internal parasitic light λip is defined as $R*D^2/(2*L*A)^2$, where D—diameter of delivery fiber, R—coefficient of reflection of WD at the parasitic wavelength, A—NA of laser radiation and L—distance at which laser light propagates over free space within the beam expander. The external light at the parasitic wavelength coupled in to the resonator has no effect on the internal light.

The share of externally generated parasitic backreflected light at parasitic wavelength λepbr is determined as $R1*(1-R)^2$, where R1 is backreflected light at parasitic wavelength coupled into the resonator. Accordingly, this share of light can be considerably reduced and even practically eliminated by adjusting the reflectivity R of WD 32. For example, with R=0.95, system 30 experiences a 400 fold increase in losses of light at parasitic wavelength compared to system 10 of FIG. 1 with the normal WD.

Returning to FIG. 4, WD 32 is coated on output surface 40 of the end connector, such as beam expander 25 and configured to process parasitic light that propagates in both forward and backreflected propagating directions. Alternatively, WD 32 may be a separate element with both of the opposite faces reflecting light at the parasitic wavelength in respective directions. Regardless of the particular configuration, WD 32 induces losses to the light at the parasitic wavelength in the parasitic resonator.

The WD 32 scatters internally generated light at parasitic wavelength λ3ip which propagates over free space in beam expander 25 in the forward propagating direction before it is incident on WD 32. Only an insignificant portion of the backreflected internally generated parasitic light λ3ipbr is coupled back into the core of feeding fiber 14, the lion's share of this light is scattered and does not enter the core of fiber 14, as indicated by blue arrows. As a result, WD 32 greatly minimizes propagation of the internally generated parasitic light towards surface 16 which remains largely unaffected by this light depending, of course, on the coefficient of reflection of WD 32.

The externally generated backreflected light at parasitic wavelength λ3epbr, i.e., a portion of internally generated parasitic light that managed to propagate through WD 32, is backreflected from surface 16 towards the waveguide of system 30. However, WD 32 retro-reflects backreflected light λ3eprr and thus minimizes the external parasitic light from coupling into the resonator. Without WD 32, if coupled into the resonator and amplified, the externally generated parasitic light may damage optical components of laser 12 in the backreflected direction and detrimentally affect surface 16 in the forward direction when it is retro-backreflected from any given formation in the waveguide.

As known, the generation of light, in this case parasitic light, in the laser occurs when the gain experienced by parasitic light in the resonator equals to the losses of this light. Accordingly, the additional losses of SRS lead to higher output powers. The following table illustrates the results confirming the above.

is twice amplified, while the losses occur only once upon backreflection of radiation into the resonator.

Figure 6:
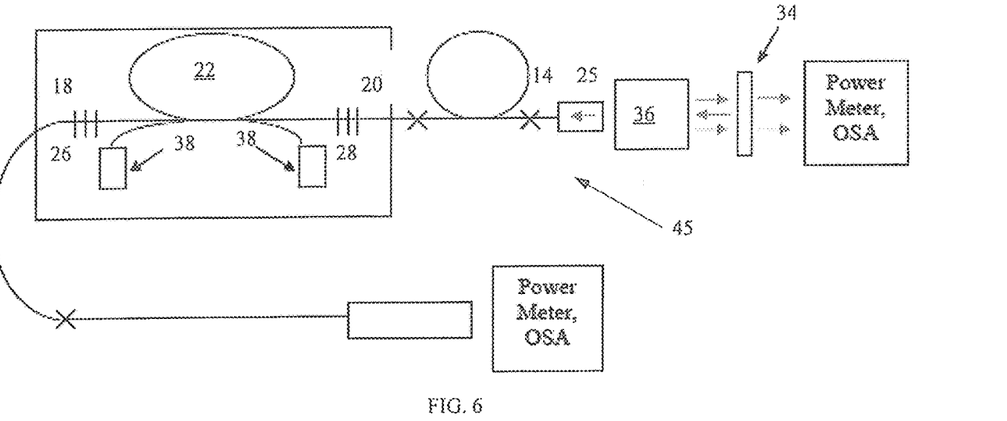
FIG. 6 is a schematic of experimental fiber laser system used for determining a threshold for nonlinear effects, such as SRS, with and without the WD of FIG. 4.
Figure 7A:
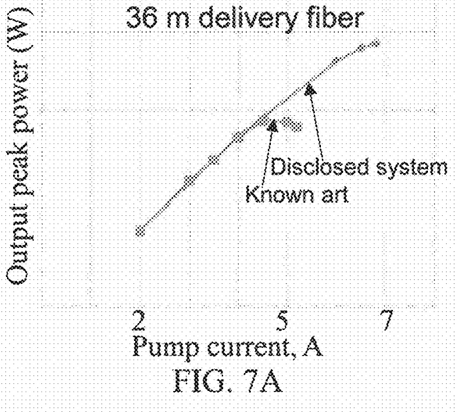
FIGS. 7A-7C illustrate watt-ampere characteristics of the output of the experimental system of FIG. 6 at different lengths of the delivery fiber.
Figure 7B:
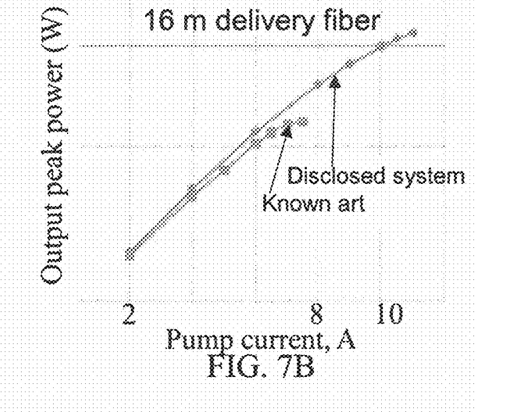
Figure 7C:
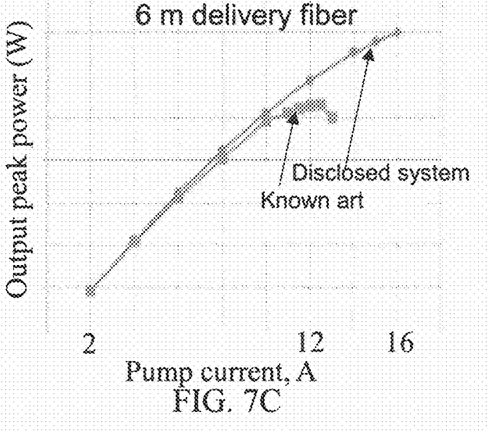

The data in the above-disclosed table has been obtained by a system 45 of FIG. 6 which is similar to systems of respective FIGS. 1 and 4. In particular, the laser source includes passive fibers 18, 20 and active fiber 22 each with a 14 μm mode field diameter (MFD) for light at the parasitic wavelength. The source is configured with a Fabri-Perrot resonator operating in a QCW regime at 1070 nm signal working wavelength and outputting a peak power of 1500 W. The output end of the system is provided with SM optical connector/beam expander 25. The test was conducted by alternating between beam expander 25 with the normal coating and disclosed WD 32, which is transparent to signal light at 1070 nm and reflects parasitic light in a spectral region between 1115 and 1150 nm. The occurrence of the lasing threshold for Raman generation is controlled by determining the spectrum of laser radiation and radiation power increase upstream from HR FBG26, and saturation of the power in the power meter downstream from plate 34. ateat the output of the radiation power increase be FIGS. 7A-7C illustrate the output peak power of the system as a function of the input current at diode pumps 38 at each length of delivery fiber 14 disclosed in the table and obtained by experimental system 45 of FIG. 6 during the above-disclosed test. The disclosed system with WD 32 is characterized by substantially higher peak powers.

Figure 8:
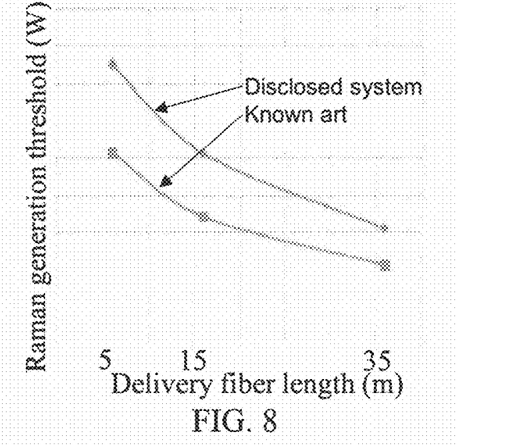
FIG. 8 illustrates a Raman generation threshold as a function of the length of the delivery fiber in the system of FIG. 6.

FIG. 8 illustrates a Raman generation threshold as a function of the length of delivery fiber 14. Confirming the conceptual basis of the present disclosure, the disclosed system with WD 32 has a substantially higher threshold than that of system 10 of FIG. 1.

Figure 9A:
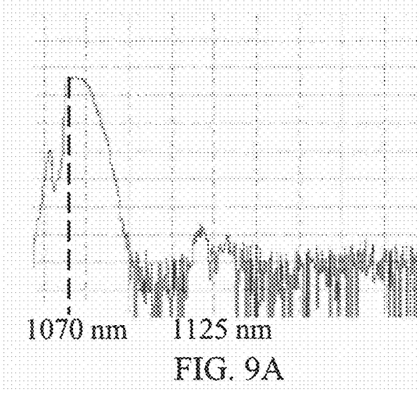
FIGS. 9A-9B illustrate emission spectra upstream from the HR FBG in the experimental laser system of FIG. 6 with and without the WD of FIG. 4 at output powers corresponding to respective thresholds for nonlinear effects, such as SRS.
Figure 9B:
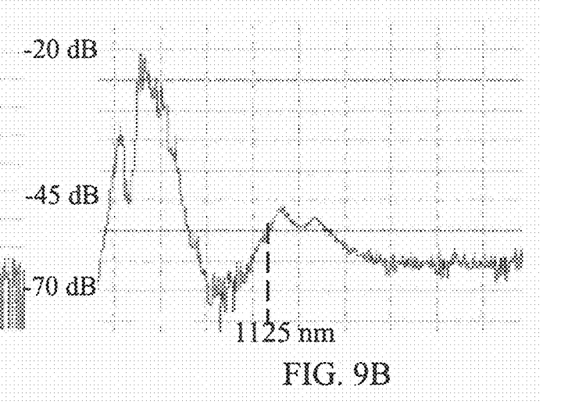

FIGS. 9A and 9B illustrate respective spectra of the laser emission upstream from HR FBG 26 of system 45 of FIG. 6 at powers triggering the Raman generation. FIG. 9A represents system 45 with disclosed WD 32, while FIG. 9B represents system 45 provided with the normal WD and characterized the threshold at lower powers than that of FIG. 9A.

Figure 10:
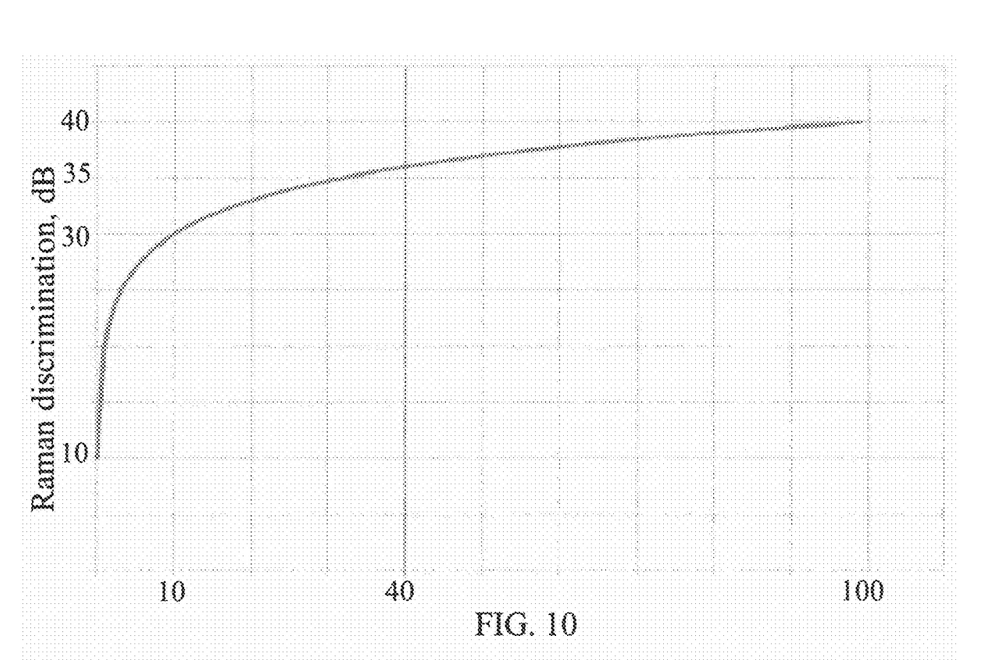
FIG. 10 illustrates additional light losses at the parasitic Raman wavelength as function of external reflection of this light in the disclosed fiber laser system of FIG. 4.

Based on the above disclosed test results, the loss difference in the resonator for Raman generation of system 45 with and without WD 32 clearly depends on the level of backreflected light at the parasitic wavelength and is equal to the difference between the external and internal variables. FIG. 10 is the graph of additional losses of the parasitic light

| WD configuration | Backreflection at 1070 nm into core of fiber | Backreflection at 1150 nm into core of fiber | Power at beginning of Raman generation. Fiber length 36 m | Power at beginning of Raman generation. Fiber length 16 m | Power at beginning of Raman generation. Fiber length 6 m |
|---|---|---|---|---|---|
| Normal | −15.5 dB | −15.5 dB | 430 W | 690 W | 1030 W |
| Disclosed | −15.5 dB | −39.8 dB | 625 W | 1027 W | 1500 W |

As follows from the above-disclosed table, the threshold for Raman generation in the system with the disclosed WD occurs at powers approximately 1.4-2-times higher than in systems with the normal WD, provided the length of the delivery fiber is the same in both systems.

Assume that additional losses of 24.3 dB are introduced by the disclosed WD in system 30. In order to reach a threshold for lasing parasitic Raman light, its gain should be 24.3/2=12.3 dB higher than that of system 10 of FIG. 1. The latter is explained by the fact that the signal in the resonator in system 45 of FIG. 6 with beam expander 25 provided with WD 32 and with the normal WD.

Figure 11:
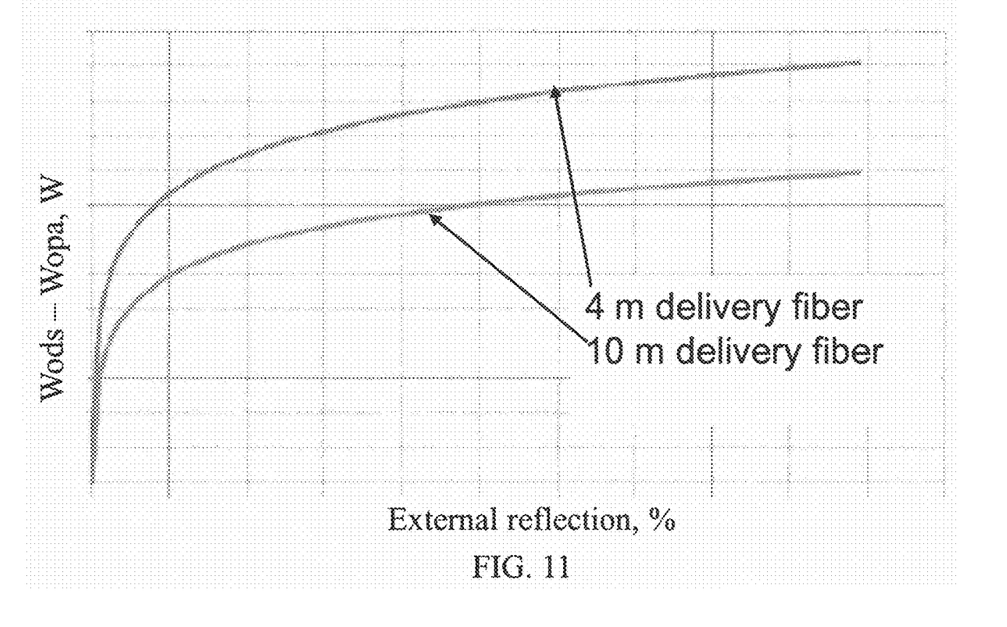
FIG. 11 illustrates the output power, representing the difference between outputs of system 4, which correspond to respective thresholds of nonlinear effects, such as SRS, with and without the WD, from external reflection of the parasitic light, wherein two graphs represent the fiber laser systems with respective different lengths of the delivery fiber.

FIG. 11 shows the difference in the maximal output power of the laser emission in the disclosed and prior art systems (Wods–Wopa), as a function of the level of backreflected parasitic light before the threshold for nonlinear effects is reached. The blue curve corresponds to the output the difference between these systems provided with a 4 meter long delivery fiber, whereas the red curve corresponds to the disclosed and prior art systems provided with a 10 meter long delivery fiber. Even at the miniscule backreflection of approximately 0.1% coupled into the core of the delivery fiber, the difference in max output powers is about 150-200 W, which is substantial compared to a nominal output power in a 1000-1500 W range.

In summary, based on the foregoing, the disclosed WD incurs substantial additional losses of the parasitic light in the resonator as a result effective suppression of the backreflected light at parasitic wavelength. The suppression of the backreflected light contributes to high thresholds for generation of parasitic light in the resonators. The difference in the output power of the disclosed and prior art systems before reaching the threshold for nonlinear effects growths as the backreflection of the parasitic light in the resonator increases (See FIG. 11). For SM QCW lasers, depending on the level of backreflection and length of the delivery fiber, this difference may as high as 750 W.

Figure 12:
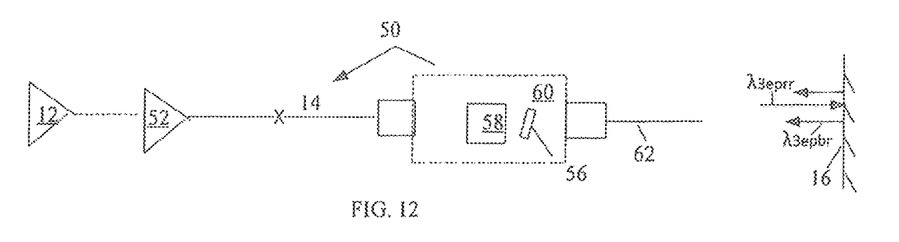
FIG. 12 is a general schematic of the disclosed fiber laser optical system provided with the WD which is configured to induce losses of parasitic light in Raman-active medium.
Figure 13:
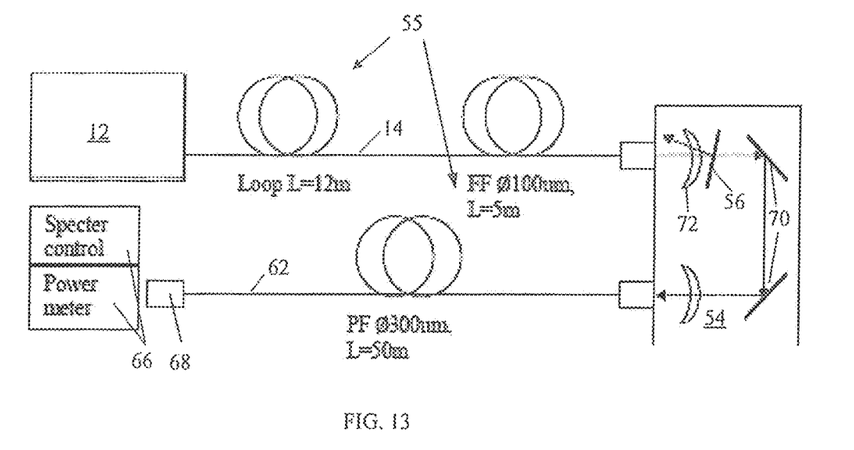
FIG. 13 is the detailed schematic of the fiber laser system of FIG. 12.
Figure 14:
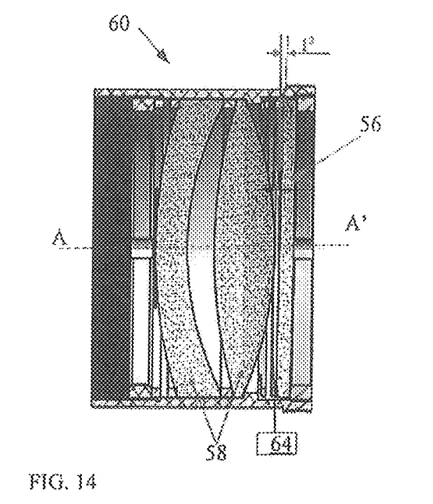
FIG. 14 shows the WD installation structure in the fiber laser system of FIGS. 12 and 13.

FIGS. 12 and 13 illustrate a high power fiber laser system 50, 55, respectively, configured with a dichroic WD 56 such as a bulk filter that in principle can be used in laser system 30 of FIGS. 4-11. The WD 56 may be located in a fiber-to-fiber coupler 60 (FIG. 12) which provides optical communication between feeding fiber 14 and passive process fiber 62 guiding light towards the final destination. Alternatively WD 56 may mounted in a beam switch 54 (FIG. 13) typically distributing the radiation from the laser source to different light recipients through respective passive process fibers 62. In either case, feeding fiber 14 is coupled to the passive output fiber of laser source 12 and functions as gain medium for the parasitic light while dichroic WD 56 operates to reflect forward propagating parasitic light before it is coupled into process fiber/gain medium 62. The amount of parasitic light coupled into gain medium 62 depends on coefficient of reflection of WD 62 which may prevent of up to 99% of this light from entering the gain medium without drastically attenuating signal light.

Turning specifically to FIG. 12, high power fiber laser system 50 may be limited to laser 12 or have one or more amplifying cascades or gain blocks 52 each including at least an active fiber, but typically having a combination of active and two passive input and output, fibers. The system output light is coupled into feeding fiber 14 guiding it to a fiber-to-fiber coupler 60 which provides optical communication over free space between feeding and process fibers 14 and 62 respectively.

The system 50 further includes a bulk light guiding and beam shaping unit 58. The system output light is incident on WD 56 that, along with unit 58 and possibly other optical components, may be housed, for example, in a casing 60.

The signal and parasitic light propagate through process fiber 62 which functions as additional gain medium for the unwanted light. Even if system 50 is configured with slanted fiber gratings of U.S. Pat. No. 7,912,099, which is fully incorporated herein by reference, process fiber 62 alone or in combination with feeding fiber 14 constitutes gain medium for parasitic light, such as Raman. As can be understood from FIGS. 12 and 13, system 50 may have a delivery (feeding and process) fiber covering a few hundred meter distance and, with the shown configuration, typically operates at high power levels of tens to hundreds kW. The fiber length and optical power density are the system characteristics which either individually or in combination with each other create favorable conditions for generation of parasitic light even without the parasitic resonator, let alone its presence. The damage that the forward propagating emitted parasitic light may inflict on surface 16 can be irreparable. In addition, if used in the surface treating process, the detrimental role of a parasitic resonator and backreflected parasitic light cannot be ignored. Accordingly, inducing losses of parasitic light in the gain medium substantially increases the system output at signal light wavelength and improves the quality of surface processing.

Referring specifically to FIG. 13, the advantages of using WD 56 capable of minimizing Raman generation in gain medium 62 were tested in system 55 that instead of the fiber-to-fiber coupler has a beam switch 54. The system is operative to measure and control the spectrum of the output beam and its power realized by unit 66 spaced from a beam expander 68 which is coupled to the output end of process fiber 62. The latter receives laser generated light from feeding fiber 14 via beam switch 54 where the light propagates over free space while being guided by mirrors 70 mounted along with a collimator 72 and WD 56 in the housing of beam switch 54.

Figure 15:
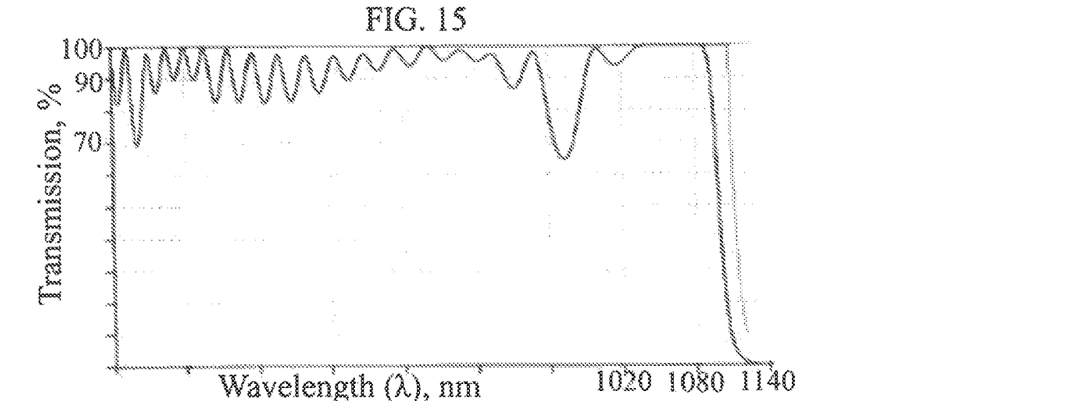
FIG. 15 is the transmission spectra of the WD of FIGS. 12 and 13.

The laser system 55 is an experimental system for determining the reflected SRS suppression at the output of process fiber 62. The WD 56 is configured as a plate with a 50 mm diameter and 2.5 mm thickness which transmits signal light at 1050-1080 nm working wavelength and reflects parasitic light at 1129-1200 nm wavelength and has transmission as shown in FIG. 15. The WD 56 is mounted in the housing at a 1°-relative to the optical axis of the collimator to prevent influence of reflected SRS radiation on laser 12. Hence the reflected SRS beam is deflected at 3.5 mm from the output end of feeding fiber 14.

Figure 16:
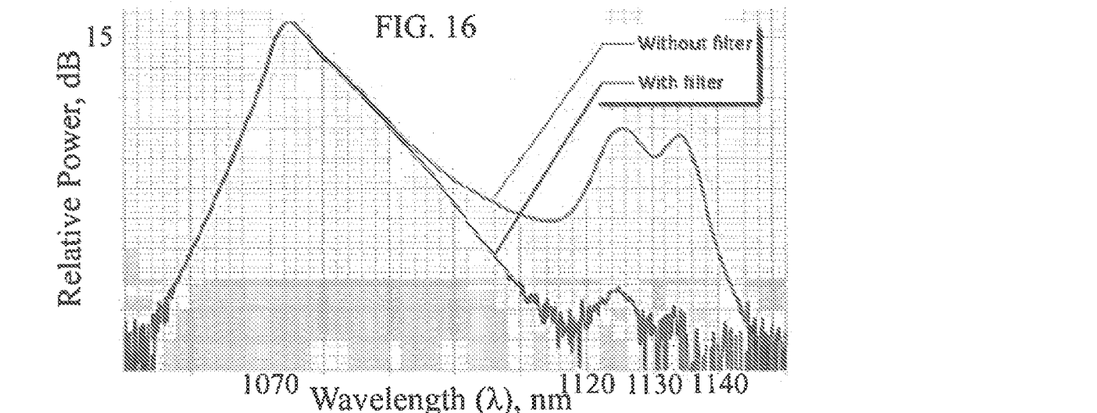
FIG. 16 is the emission spectra of the disclosed fiber laser system provided with and without the WD of FIGS. 12 and 13.
Figure 17:
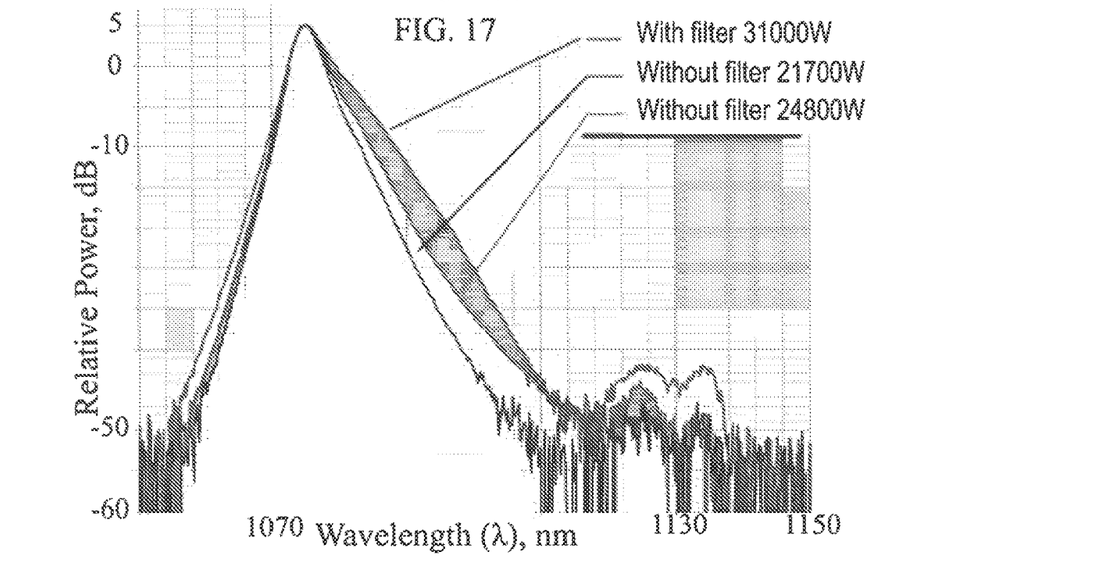
FIG. 17 illustrates the laser spectra of system of FIG. 13 with and without the WD at different full powers.

The experimental system 55 is configured to output 31 kW using a Ø 100 μm, 112 m long feeding fiber. Two tests, one with WD 56 and the other without it, resulted in respective two spectra as shown in FIG. 16. The suppression of the SRS level, i.e., the difference between these spectra is 27 dB at 1135 nm. Additional tests were conducted with the same system operating at different full output powers with and without WD 56. The results are presented in FIG. 17 and demonstrate that the installation of dichroic WD 56 allows increasing the output power at more than 30%.

Although the present disclosure has been described in terms of the disclosed example, numerous modifications and/or additions to the above-disclosed embodiments would be readily apparent to one skilled in the laser arts without departing however from the scope and spirit of the following claims.

The invention claimed is:

1. A method of inducing losses of light at a parasitic wavelength in a fiber laser system,
   the fiber laser system includes a laser source generating light at a signal wavelength different from the parasitic wavelength, a delivery fiber guiding light at parasitic and signal wavelengths, and wavelength discriminator (WD) configured to reflect a desired portion of light at the parasitic wavelength and transmit light at the signal wavelength,
   the method comprising providing free-space optical communication between the delivery fiber and WD, thereby suppressing emission of light at the parasitic wavelength at an output of the fiber laser system.

2. The method of claim 1 wherein the suppression of the emission of light at the parasitic wavelength includes backreflecting the desired portion of forward propagating light at the parasitic wavelength and retro-backreflected light at the parasitic wavelength reflected from the surface, the WD being a dichroic filter having a coefficient of reflection which determines the the desired portion of reflected light at the parasitic wavelength, the light at the signal wavelength being emitted in a single transverse mode or multiple transverse modes.

3. The method of claim 1 further comprising
mounting a free space optical component between an output end of the delivery fiber and WD,
laser treating a workpiece, wherein the WD suppresses the emission of light at the parasitic wavelength by inducing losses of light at the parasitic wavelength in a parasitic resonator which is formed, if not for the WD, between the surface, backreflecting the desired portion of light at the parasitic wavelength, any formation of the fiber laser system capable of retro-backreflecting the backreflected light and a fiber length between the surface and formation functioning as gain medium.

4. The method of claim 3 further comprising
coating the WD on an output surface of the free-space optical component, thereby backreflecting the desired forward propagating light at the parasitic wavelength, wherein the free-space optical component includes a beam-expander coupled to the output end of the delivery fiber filter; and
while backreflecting light at the parasitic wavelength from the WD, deflecting a part of the forward-propagating light at the parasitic wavelength away from the delivery fiber.

5. The method of claim 4, wherein the WD is a multilayer film coated on an output surface of the free-space component which is a beam expander made of quartz, the WD being configured to provide
a several hundredfold increase in losses of light at the parasitic in the fiber laser system of any of the above claims but without the WD,
at least 1.4-2-time increase of an output power of the fiber laser system necessary to reach a threshold for generating light at the parasitic wavelength in the resonator compared to the fiber laser system without the WD, wherein the fiber laser system is configured with a Fabri-Perot fiber oscillator having an active fiber, which is doped with ions of ytterbium and operating at a 1070 nm signal light wavelength in a quasi-continuous regime, and the WD is configured with the coefficient of reflection greater than 99.6% in a 1115-1150 nm range corresponding to a range of wavelength of stimulated Raman scattering for Yb-doped fiber lasers.

6. The method of claim 1 further comprising
coupling the free-space optical component between two opposing to one another and spaced apart inner ends of the delivery fiber, wherein a length of the delivery fiber between the laser source and the free-space optical component is a feeding fiber and a length of the delivery fiber after the free-space optical component is a process fiber, the free space optical component being a beam switch or fiber-to-fiber coupler;
mounting the WD within a housing of the free space optical component at distance downstream from a collimating unit in a forward propagating direction of light at the parasitic wavelength, wherein the WD being a bulk dichroic filter, thereby inducing losses of light at the parasitic wavelength in the delivery fiber.

7. The method of claim 1 further comprising controllably tilting the WD relative to a plane of light path, thereby deflecting a part of the reflected forward-propagating light at the parasitic wavelength away from the delivery fiber, wherein the WD increases an output power of the fiber laser system corresponding to a threshold of generation of stimulated emission of light at the parasitic wavelength at more than 30% compared to the same fiber laser system without the WD.

8. A fiber laser system, comprising:
a fiber laser source generating forward propagating light in a single transverse mode or multiple transverse modes at signal wavelength;
a delivery fiber in contact with a passive output fiber of the laser source, the light at the signal wavelength having optical intensity sufficient to exceed a threshold for generating light at a parasitic wavelength in a fiber waveguide which includes passive and active signal fibers, output fiber and delivery fiber, the parasitic and signal wavelengths being different; and
a WD receiving light at the signal and parasitic wavelengths from the delivery fiber over free space and configured to suppress emission of light at the parasitic wavelength.

9. The fiber laser system of claim 8, wherein the WD is a dichroic filter is configured with a coefficient of reflection selected to reflect a desired portion of the forward propagating light at the parasitic wavelength while transmitting light at the signal wavelength.

10. The fiber laser system of claim 8, wherein the fiber laser source includes one or more gain blocks, each having a combination of the active signal fiber and input and output passive signal fibers which are spliced to respective opposite ends of the active fiber, and a passive output signal fiber spliced to an input end of the delivery fiber.

11. The fiber laser system of claim 8 further comprising a free-space optical component between the delivery fiber and WD.

12. The fiber laser system of claim 11, wherein the free-space optical component includes a beam expander coupled to an output end of the delivery fiber and configured to train a system output light at a workpiece, which during an operation of the fiber laser system
backreflects light at the parasitic wavelength and forms a parasitic resonator with a formation along the waveguide, capable of retro-backreflecting the backreflected light, and gain medium including a length of the waveguide between the workpiece and formation, the WD being a dichroic film filter coated upon an output surface of the beam expander or a bulk dichroic filter and reflecting the desired portion of the forward propagating light at the parasitic with a part of the desired portion being deflected away from the delivery fiber, and
retro-backreflecting the light at the parasitic wavelength backreflected from the workpiece so as to induce losses of the light at the parasitic wavelength in the parasitic resonator.

13. The fiber laser system of claim 12, wherein the WD induces losses of light at the parasitic wavelength in the parasitic resonator sufficient to increase an output power of the laser system output light before reaching the threshold for generating light at the parasitic wavelength in at least 1.4-2 times than the fiber laser system without the WD, wherein the gain block includes a Fabri-Perot fiber ytterbium oscillator operating at in a 1060-1080 nm signal light wavelength in a quasi-continuous regime, and the WD is configured with the coefficient of reflection greater than 99.6% in a 1115-1150 nm range corresponding to a range of wavelength of stimulated Raman scattering for Yb-doped fiber lasers.

14. The fiber laser system of claim 8, wherein the free-space optical component is selected from a beam switch or fiber-to-fiber coupler, each having a housing, and located between two opposing and spaced apart inner ends of the delivery fiber, wherein a length of the delivery fiber between the laser source and the free-space optical component is a feeding fiber and a length of the delivery fiber after the free-space optical component is a process fiber, the housing enclosing the WD and a collimating unit which is spaced from the WD in a backreflecting direction.

15. The fiber laser system of claim 14, wherein the WD is tiltably mounted in the housing relative to the a plane of light path so as to deflect light at the parasitic wavelength away from the plane, wherein the WD increases an output power of the fiber laser system corresponding to a threshold of generation of stimulated emission of light at the parasitic wavelength at more than 30% compared to the same fiber laser system without the WD.

16. The fiber laser system of claim 14 further comprising a measurement unit configured to measure a power of the system output light, power of the backreflected light at the parasitic wavelength and a spectrum of the system output light.

* * * * *